United States Patent [19]

McNamara et al.

[11] Patent Number: 5,143,361

[45] Date of Patent: Sep. 1, 1992

[54] POWER CLAMP

[75] Inventors: Jeffrey S. McNamara, Rochester Hills; Kosta Dimefski, Warren, both of Mich.

[73] Assignee: Peninsular, Inc., Roseville, Mich.

[21] Appl. No.: 729,354

[22] Filed: Jul. 12, 1991

Related U.S. Application Data

[63] Continuation of Ser. No. 496,122, Mar. 19, 1990, Pat. No. 5,046,706.

[51] Int. Cl.⁵ .............................................. B23Q 3/08
[52] U.S. Cl. .................................... 269/32; 269/228; 411/432; 411/437
[58] Field of Search ............. 269/25, 32, 228, 229, 269/280, 80; 384/291, 292; 411/432, 433, 437, 279

[56] References Cited

U.S. PATENT DOCUMENTS

| | | | |
|---|---|---|---|
| 1,367,615 | 2/1921 | Malone | 411/279 |
| 3,027,155 | 3/1962 | Paterson | 269/32 |
| 3,347,542 | 10/1967 | Mericle | 269/32 |
| 4,021,027 | 5/1977 | Blatt . | |
| 4,458,889 | 7/1984 | McPherson et al. . | |
| 4,570,914 | 2/1986 | Blatt . | |
| 4,681,992 | 7/1987 | Kazmierski . | |

FOREIGN PATENT DOCUMENTS

| | | | |
|---|---|---|---|
| 512628 | 1/1921 | France | 384/292 |
| 983095 | 1/1951 | France | 269/283 |

OTHER PUBLICATIONS 24 pages of DE-STA-CO drawings, 1985.
Fisher A Style AP Model Cylinder (5 sheets); at least as early as 1977.
Stellhorn Catalog (1982), p. 104, Air-Hydraulic Cylinders.
ISI Mfg., Inc. brochure entitled "Power and Manual Industrial Clamps".
Bellows-Valvair brochure (1966) front page "Air Motor".
Lincoln Controls Hydraulic Pneumatic Systems and Equipment Catalog (1982), p. 186, Sheffer Series MH Hydraulic Trunnion Front Mount Style TF.

*Primary Examiner*—J. J. Hartman
*Attorney, Agent, or Firm*—Harness, Dickey & Pierce

[57] ABSTRACT

A power clamp is provided that clamps the workpiece when the piston rod is retracted into the cylinder housing thereby preventing damage to the rod and clamp components that could occur from weld flash and other debris created while operations are performed on the workpiece. Other features are disclosed which increase reliability and enable a variety of different arms to be used with the basic clamp construction.

18 Claims, 4 Drawing Sheets

POWER CLAMP

This is a continuation of U.S. patent application Ser. No. 07/496,122, filed Mar. 19, 1990, now U.S. Pat. No. 5,046,706.

BACKGROUND OF THE INVENTION

1. Technical Field

This invention relates to devices for clamping workpieces and, more particularly, to power clamps operating under the control of reciprocal actuators to clamp and release the workpiece.

2. Discussion

Power clamps typically include a clamping arm that pivots between release and clamping positions under the control of a reciprocal actuating device such as an air cylinder. U.S. Pat. No. 4,458,889 to McPherson et al. and U.S. Pat. No. 4,021,027 to Blatt disclose known power clamps. In these designs, when the arm is in a clamping position (typically 90 degrees with respect to the axis of the cylinder piston rod) the piston rod is extended from the cylinder housing. Accordingly, the rod and associated linkage are subjected to adverse environmental conditions that are encountered when some operations are performed on the clamped workpiece. For example, power clamps are often used to weld two pieces of sheet metal. Weld flash and other debris often accompany this operation. Such debris can become lodged in the clamp head and cause poor performance and, in some instances, damage to the clamp.

The known power clamps also suffer from a variety of other disadvantages. In the above noted prior art designs the clamping arm is an integral part of the pivot linkage. As a result, it is difficult for the user to tailor the known power clamps to the user's specific operation. Many of the power clamp designs use cams or guides to create the pivoting action for the clamp arm, they use relatively small components and their rotating parts are subject to wear since there is no good provision for lubricating them. Thus, these designs are unduly complex and can lead to increases in manufacturing costs and a decrease in reliability.

Those persons knowledgeable in this art are probably aware of still other drawbacks of the prior art clamps.

SUMMARY OF THE INVENTION

Pursuant to the present invention, a power clamp is provided with means coupled between the piston rod of an actuating cylinder and the clamp arm. These means are designed so that they pivot the arm to a release position when the rod is extended from the cylinder housing. In contrast, the arm is pivoted to a clamping position when the piston rod is substantially retracted into the cylinder housing. As a result, the piston rod and other components of the clamp are protected when potentially damaging operations are performed on the clamped workpiece.

Other aspects of the present invention include the provision of mounting means on an outer pivot link that enables a wide variety of clamp arms to be mounted thereto. Accordingly, the user can easily apply a desired shape and length of a clamp arm to the link with minimal effort. The inventive design is also characterized by a relatively wide and more stable pivot construction, as well as other features that enhance its reliability.

BRIEF DESCRIPTION OF THE DRAWINGS

Various other advantages of the present invention will become apparent to those skilled in the art after reading the following specification and by reference to the drawings in which.

DESCRIPTION OF THE PREFERRED EMBODIMENT

Figure 1:
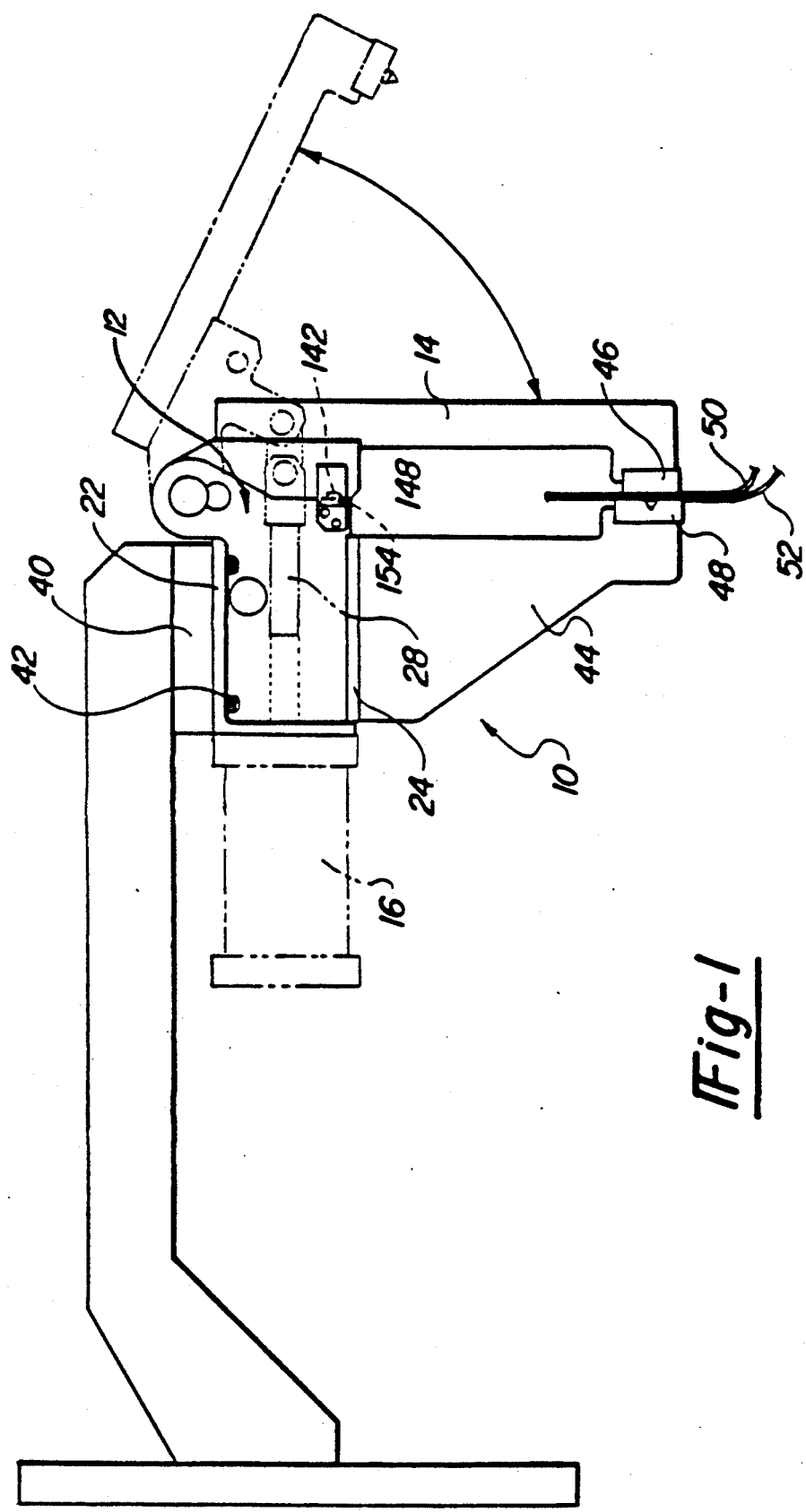
FIG. 1 is an environmental view showing a power clamp made in accordance with the teachings of this invention, solid lines being used to illustrate the clamping arm in a clamping position whereas phantom lines depict the arm in a release position.

The power clamp 10 includes three main components: a pivoting clamp arm 14, an air cylinder 16 and a clamp head 12. As will appear, clamp head 12 houses the pivoting components that translate motion of the piston rod in the air cylinder 16 into arcuate motion of the clamp arm 14. The clamp head 12 includes a pair of side plates 18, 20, an L-shaped plate 22 and an opposing rectangular plate 24 which is shown in FIG. 1 as defining the bottom of the clamp head 12. Each of the plates is suitably connected together so as to define a protected generally rectangular, hollow housing enclosure which can be made of an integral casting, if desired.

One end of plate 22 includes an opening 26 through which a piston rod 28 extends. Piston rod 28 reciprocates along its major axis under the control of air pressure selectively applied to ports in cylinder 16 in a manner known in the art. Cylinder 16 can be a Peninsular Model No. CP9250 or CP9325 cylinder although other commercially available cylinders can be used. Cylinder 16 is connected to clamp head 12 so that the piston rod 28 is concentrically mounted within opening 26.

FIG. 1 illustrates an example of how the power clamp 10 can be used in a typical manufacturing environment. Clamp 10 is fixed to a support 40 by way of a plurality of bolts 42 or the like passing through plate 22 into the support 40. A downwardly depending fixed electrode arm 44 is stationarily mounted to plate 24. The pivotable clamping arm 14 and the fixed arm 44 are fitted with suitable electrodes 46, 48 for welding two metallic sheets 50, 52 together. It should be understood, however, that the present invention can be used in a wide variety of different clamping operations.

Figure 4:
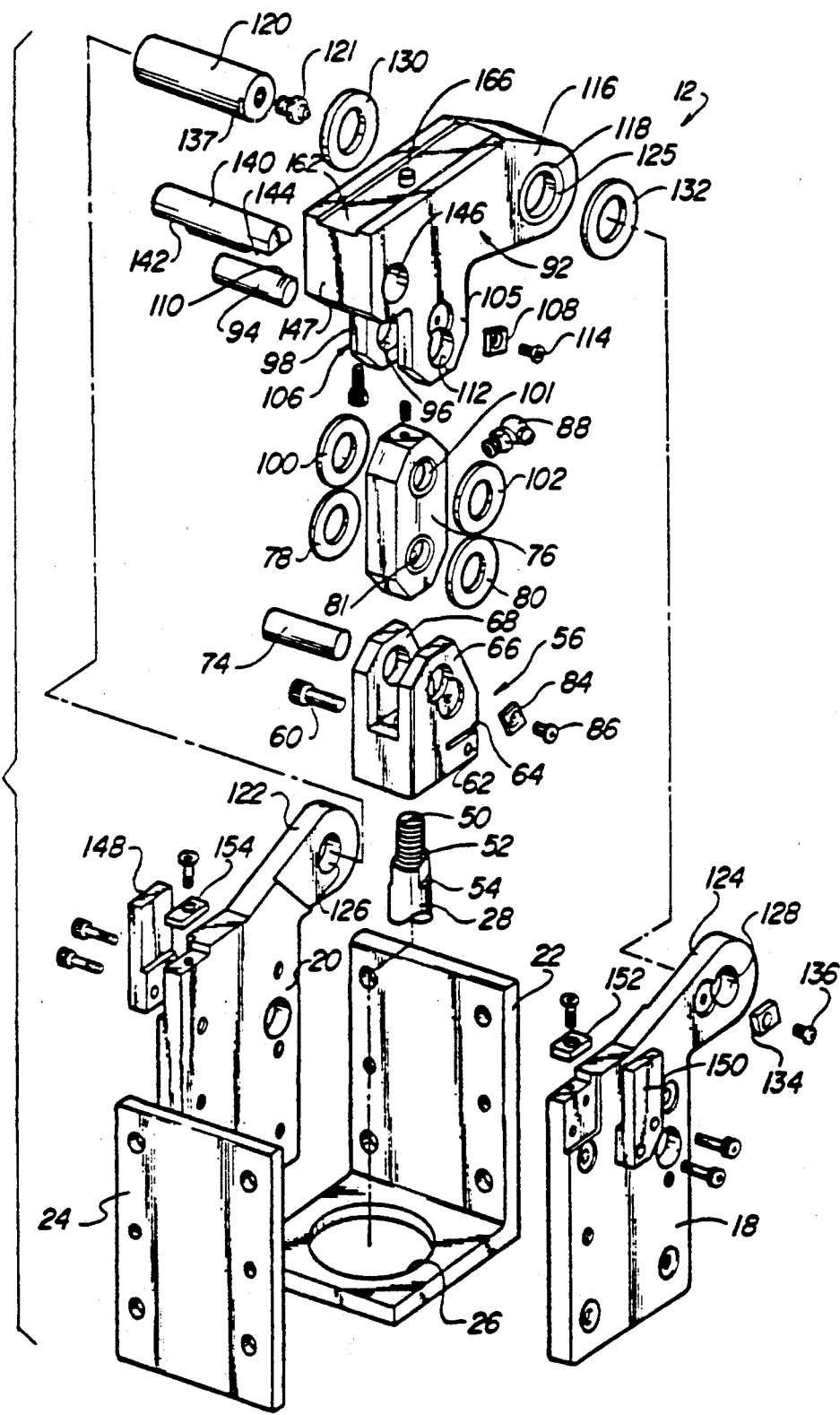
FIG. 4 is an exploded perspective view of the clamp head components.
Figure 5:
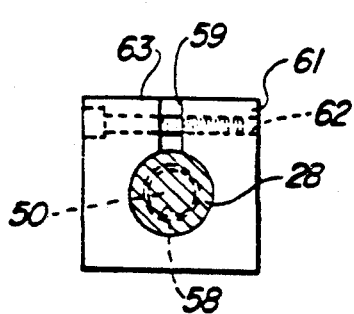
FIG. 5 is a cross-sectional view illustrating an end of the piston rod coupler, taken along the lines 5—5 of FIG. 3.

The end of piston rod 28 has a reduced diameter threaded section 50 with a transverse shoulder 52 and a pair of side flats 54 as can be seen most clearly in FIG. 4. Piston rod end section 50 is threaded into a threaded opening 58 in one end of coupler 56. A transverse cut 64 runs laterally across the coupler 58 at an inner end of opening 58. An axial cut 59 (see FIG. 5) runs parallel to the axis of opening 58 and extends the length thereof. These two cuts, 59, 64 define ear portions 61, 63 through which a threaded hole 62 has been tapped. After the piston rod end 50 has been threaded into opening 58, a screw 60 is threaded into opening 62 to urge the opposing portions 61, 63 together to thereby further clamp the piston rod 28 to coupler 56 in a secure manner.

Figure 6:
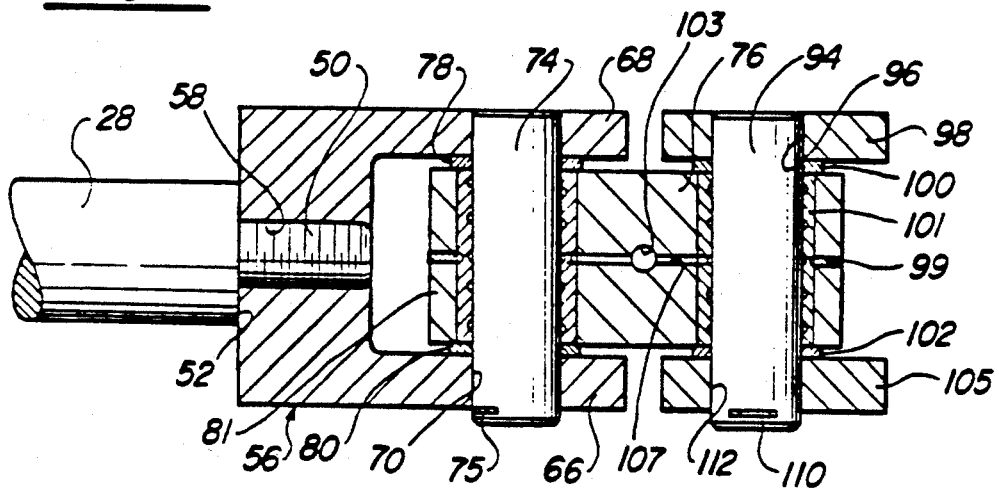
FIG. 6 is a cross-sectional view taken along the lines 6—6 of FIG. 2.

The opposite end of coupler 56 is bifurcated to provide a pair of clevis members 66 and 68 for connection to one end of an intermediate link 76. The opposite end of link 76 is connected to the leg portion 106 of a generally T-shaped outer link 92. The connection between these members is shown most clearly in FIG. 6. A shaft 74 passes through opening 70 in clevis member 66, thrust washer 80, bushing 81, thrust washer 78 and then through an opening 72 in the opposite clevis member 68. The protruding end of shaft 74 includes a flat groove 75 therein which receives an end of a generally square keeper 84 secured by fastener 86. In such manner, relative motion between shaft 74 and coupler 56 is prevented.

The opposite end of link 76 is connected to leg 106 of outer link 92 in a similar manner. Shaft 94 passes through opening 96 in clevis flange 98, thrust washer 100, bushing 101, thrust washer 102 and then through opening 112 in clevis flange 105. Shaft 94 is held in place by analogously using keeper 108 held in flat groove 110 by fastener 114 in recess 112.

Figure 7:
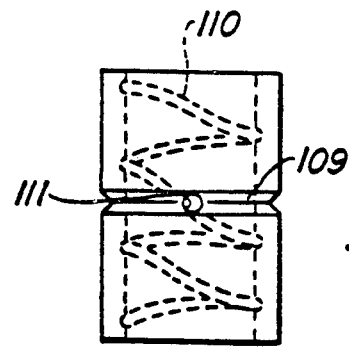
FIG. 7 is a plan view of a bushing that aids in the lubrication of rotating parts in the clamp.

Link 76 has a transverse bore 103 which meets with an axially extending bore 107 which has been plugged at both ends via plugs 99. A grease fitting 88 is mounted in bore 103 for introducing grease into bores 103 and 105 for lubricating the rotating joints. FIG. 7 illustrates a preferred construction for the bushings 81 and 101. The outer surface of these bushings include a circumferential groove 109 which is in line with the bore 107 for receiving lubricant therefrom. The lubricant is transmitted from groove 109 through a transverse hole 111 therein so that the grease can flow to the inner surface of the bushing. The inner surface of the bushing includes one or more spiral grooves 110 therein that runs the length of the bushing. Thus, grease from fitting 88 can flow through the bores 103, 107 to the grooves 109 in the bushings 81, 101; then the lubricant flows through opening 111 into the grooves 110 to thereby lubricate the shafts 74, 94. By providing this link construction and the use of the thrust washers, it is expected that the reliability and life of the rotating members can be increased since they can be conveniently periodically lubricated.

Figure 8:
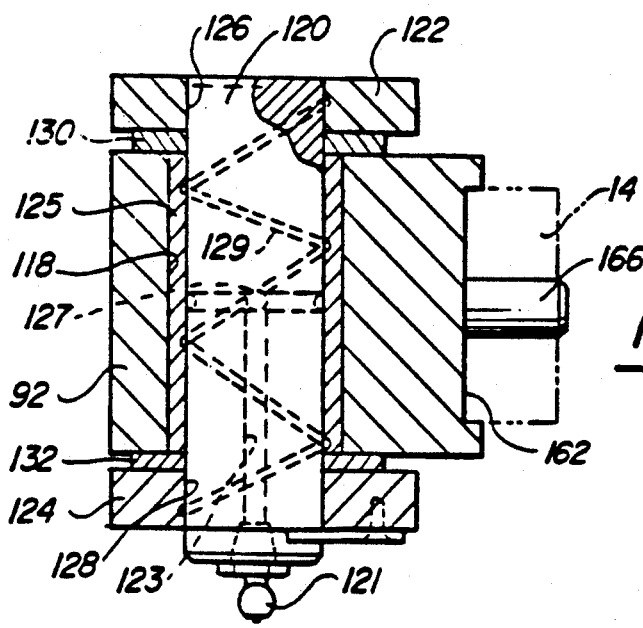
FIG. 8 is a cross-sectional view taken along the lines 8—8 of FIG. 3.

Shaft 120 in the arm portion of outer link 92 serves as a pivot point between the clamp head 12 and outer link 92. The connection therebetween is shown most clearly in FIG. 8. Shaft 120 passes through opening 126 in an ear portion 122 of clamp head plate 20, thrust washer 130, bushing 125 in opening 118 in the arm 116 of outer link 92, thrust washer 132 and then through opening 128 in the ear portion 124 of bracket 18. A keeper 134 and fastener 136 arrangement similarly rides in a flat groove 137 in shaft 120 to prevent it from rotating relative to the clamp head 17. The shaft 120 includes an axial bore 123 that communicates with a grease fitting 121. A transverse hole 127 delivers grease to the inner surface of bushing 125 which also contains one or more spiral grooves 129 therein for distributing the lubricant onto shaft 120.

Provision is made for limiting the travel of the outer link 92 during movement to the clamping position in which the arm 14 is brought downwardly against the workpiece as shown in FIG. 1. To this end, outer link 92 includes an opening 146 in arm portion 147 opposite the shaft opening 118 in the other arm portion 116. Opening 146 receives a pin 140 therein that has two flat surfaces 142 and 144. These surfaces abut stops 154 and 152, respectively, fastened to inner ends of clamp head plates 18 and 20 when the arm 14 is brought into the position shown in FIG. 1. A pair of guides 148 and 150 adjacent outer ends of pin 140 provide lateral support for the link 92 in the event of offset loading. As can be seen in the drawings, keyway 162 is in the form of a slot having a generally flat bottom and side walls.

A keyway 162 is formed in an elongated outer surface of the generally T-shaped outer link 92. A precisely located opening 164 is transversely provided in the bottom of keyway 162 and a dowel 166 is press fit therein. All of the other dimensions of the clamp are referenced against the center line of the dowel 166. As a result, plant engineering, the plant manufacturer, the maker of arm 14 and all other interested parties have a precise point of reference from which to work. It is a feature of this invention that various arms 14 can be used . with the same clamp construction. Thus, is possible for the manufacturing plant to have several precisely machined arms for performing different operations within the plant, yet use all of these different arms with the same main power clamp construction. When making the arm, a transverse opening 167 is formed therein for receiving the dowel 166 and the lower portions of the arm are dimensioned to fit within the sidewalls of the keyway 162. In such manner, all of the different arms can be mounted on the power clamp merely by inserting the dowel 166 through the opening 167 in the arm and fitting the lower portion of the arm within the keyway 162. The opposite end of the arm will then be precisely located automatically. The arm can be secured in place by a variety of means, such as by welding if a more permanent connection is desired or by a suitable fastener arrangement if more quick interchangeability is sought.

Figure 2:
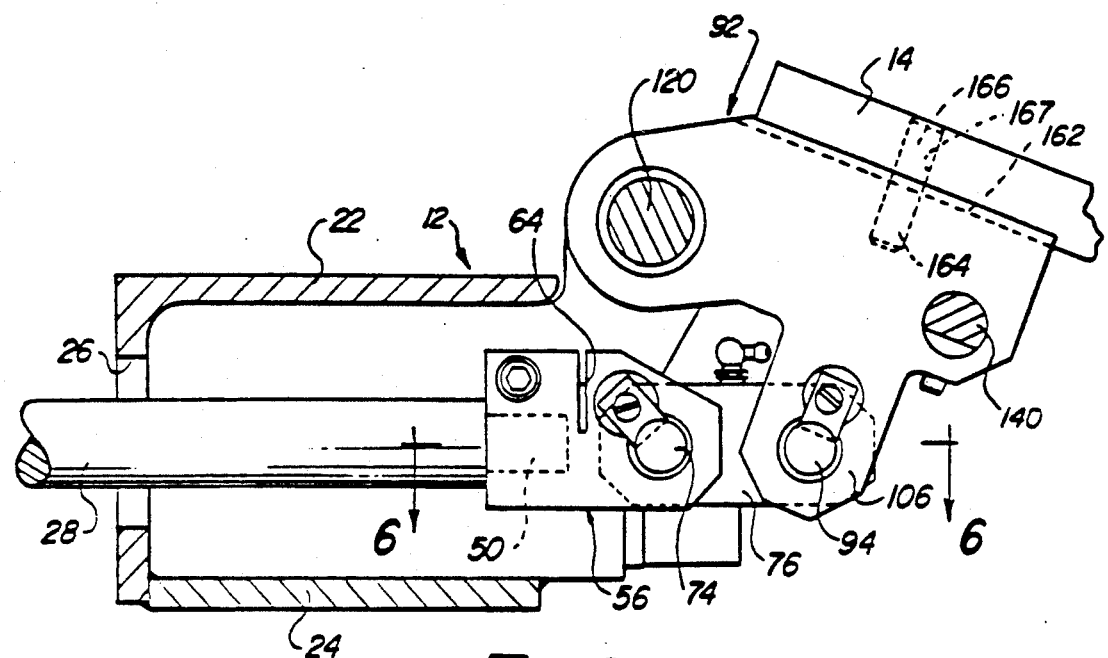
FIG. 2 is a cross sectional view of the clamp showing the arm in its release position.
Figure 3:
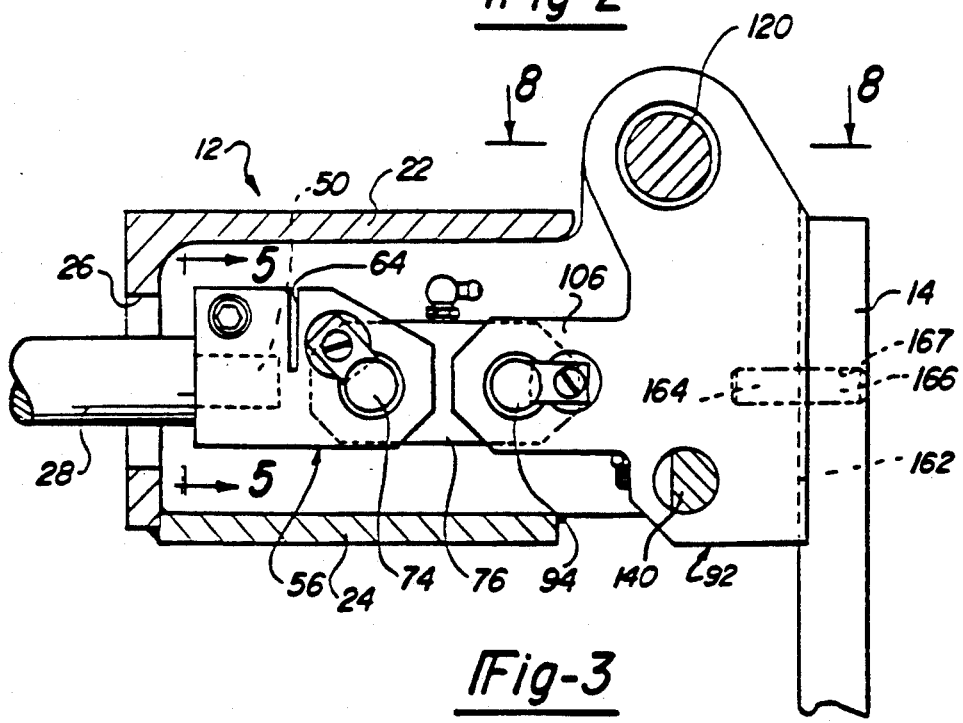
FIG. 3 is a side view similar to FIG. 2 except that it illustrates the arm in its clamping position.

As noted above, FIG. 2 illustrates the clamp 10 in the unclamped position. To move arm 14 to the clamping position shown in FIG. 3, the air cylinder 16 causes piston rod 28 to retract into the cylinder housing, i.e., leftwardly as illustrated in FIG. 2. This motion pulls coupling 56 and link 76 with it causing outer link 92 to rotate about the fixed pivot axis provided by shaft 120. It is important to note the simplicity of the linkage design of the present invention keeping in mind the relatively complex constructions of the prior art. There are no cams or slides required and the force of the cylinder 16 is maximized because of the in-line design of the coupler 56, intermediate link 76 and shaft 94 of the outer link 92. As the piston rod 28 moves further to the left, it carries the clamping arm 14 downwardly until the pin surfaces 142, 144 contacts the stops 154, 152 thereby clamping the moveable clamping arm 14 against the fixed arm 44 as shown in FIG. 1 In this clamping position, operations can be performed on the workpiece, e.g., welding the workpieces 50, 52 together. It should be appreciated that when the welding takes place almost all of the internal components of the clamp are protected within the clamp head housing. The piston rod 28 is retracted into the cylinder housing, and the linkage mechanisms are protected by the plates 18-24 defining the clamp head housing. As a result, weld flash or other debris created during welding of the workpieces are prevented from damaging these components. After the welding operation is completed, the air cylinder 16 is actuated to move the piston rod 28 rightwardly to move the arm 14 to its unclamped position as shown in FIG. 2.

It should be understood that while this invention has been described in connection with one particular example, the broader scope and spirit of this invention is not so limited. This is because various modifications will become apparent to those skilled in the art after having the benefit of studying the specification, drawings and following claims.

What is claimed is:

1. A power clamp comprising:
   a clamp head housing;
   a reciprocating actuating cylinder having a piston rod with a major axis said cylinder coupled with said clamp head housing;
   movable clamp arm means for clamping a workpiece; and
   means coupled between the piston rod and the clamp arm for pivoting the arm to a release position when the rod is extended from the cylinder, with said means pivoting the arm to a clamping position for clamping the workpiece; and
   said means being defined by three, rotational only pivotal connections, said means including an outer pivoting link having one end pivotally connected at a first pivotal connection to a stationary member, and an intermediate link having one end pivotally connected at a second pivotal connection to another portion of the outer link which moves with the piston rod, with another end of the intermediate link being pivotally connected at a third pivotal connection to the piston rod and said intermediate link moving in a direction along the major axis and said first and second pivots located on a bottom surface of said clamping arm with said second pivot located between said first pivot and the workpiece.

2. The power clamp of claim 1 which further comprises:
   mounting means for attaching the clamping arm to an outer surface of the outer link whereby different arms can be used with the same main clamp construction.

3. The power clamp of claim 2 wherein said mounting means comprises a keyway formed in an elongated outer surface of the outer link and a dowel extending therefrom, the clamping arm being fit within the keyway so that the dowel extends transversely through an opening in the arm.

4. The power clamp of claim 1 which further comprises:
   coupler means for removably connecting the piston rod to the clamp head, and wherein said another end of the intermediate link is pivotally connected at said third pivotal connection to said coupler means.

5. The power clamp of claim 3 wherein an end of the piston rod is threaded and said coupler means comprises:
   a member with an interrupted threaded opening having a peripheral gap, the opening receiving the threaded end of the piston rod, and fastener means bridging the gap for drawing opposite portions of the member together to thereby clamp the piston rod in the opening.

6. A power clamp comprising:
   a generally hollow clamp head housing defined by a first plate, a second plate opposite the first plate, and a pair of side plates, with the side plates including ear portions;
   an air cylinder attached to the clamp head housing, the cylinder having a piston rod extending therefrom which is reciprocally moveable about an axis;
   a coupler removably connected to an end of the piston rod;
   an intermediate link directly connected to an opposite end of the coupler by a first, rotational only pivotal connection, said intermediate link moving in a direction along said axis;
   a generally T-shaped outer link having a leg portion in the form of a clevis which is directly rotatably mounted to another end of the intermediate link at a second, rotational only pivotal connection, one arm of the outer link being connected to the ear portions of the side plates of the clamp head at a third, rotational only pivotal connection to thereby define a stationary pivot point for the outer link wherein said second and third pivots located on a bottom surface of a clamping arm with said second pivot located between said third pivot and a workpiece;
   a clamping arm; and
   mounting means on the outer link for attaching the clamp thereto.

7. The clamp of claim 6 wherein said mounting means comprises a keyway formed in an outer surface of the outer link and a dowel extending transversely therefrom, and wherein the arm is dimensioned to fit within the keyway and includes an opening for receiving the dowel.

8. The clamp of claim 6 wherein said outer link is pivoted to a clamping position with the clamping arm extending substantially transversely to the piston axis when the piston rod is substantially retracted into the cylinder.

9. The clamp of claim 6 which further comprises:
   a first shaft connecting the coupler to said opposite end of the intermediate link; and
   a second shaft for connecting said another end of the intermediate link to the outer link; and
   wherein the centers of said shafts are collinear with the piston rod axis.

10. The clamp of claim 9 wherein said intermediate link has internal passageways therein for lubricating the first and second shafts.

11. The clamp of claim 10 wherein the intermediate link carries an external grease fitting in communication with said passageways.

12. The clamp of claim 11 wherein ends of said intermediate link fit within clevis members formed on said coupler and outer link, and wherein the clamp further comprises:
   first and second bushings surrounding the first and second shafts, respectively between the clevis members;
   a pair of thrust washers on the first and second shafts, respectively, disposed between the bushings and the clevis members;
   flat grooves in peripheral portions of the shafts; and
   keeper means fit within the flat grooves for preventing relative rotation between the first shaft and the coupler, and the second shaft and the outer link, respectively.

13. The clamp of claim 12 wherein each of said bushings comprises:
an outer peripheral groove aligned with a passageway in the intermediate link, a transverse hole through the groove communicating with an inner surface of the bushing, and spiral grooves in the inner surface of the bushing for distributing lubricant to the shaft.

14. The claim of claim 6 which further comprises a pin protruding from the outer link;
stops on the clamp head housing; and
wherein said pin abuts the stops when the outer link has pivoted to the clamping position.

15. The improvement of claim 10 wherein the mounting means comprises a keyway cut into a surface of the member and a dowel extending transversely therefrom, with the arm being dimensioned to fit within the keyway and including a transverse opening therein for receiving the dowel.

16. The power clamp of claim 6 wherein said third pivotal connection comprises:
a shaft passing through said one arm of the outer link and said ear portions;
a bushing surrounding the shaft;
a first thrust washer being disposed between an ear portion and the outer link surrounding one end of the shaft;
a second thrust washer being disposed between an opposite ear portion and the outer link surrounding an opposite end of the shaft;
means for preventing relative rotation of said shaft relative to the ear portions of the clamp housing; and
means for lubricating said bushing.

17. The clamp of claim 16 wherein said means for preventing relative rotation comprises:
flat grooves in peripheral portions of the shaft; and keeper means fit within the flat grooves and removably mounted to the outer link.

18. In a clamp having a pivoting member and a clamping arm, the improvement wherein mounting means are formed on the pivoting member for attaching interchangeable clamping arms thereto, said mounting means being arranged on said pivoting member to permit different arms to be used with a standard clamp design without requiring disassembly of the pivoting member from other clamp components, the clamp including:
a generally hollow clamp head housing defined by a first plate, a second plate opposite the first plate, and a pair of side plates, with the side plates including ear portions;
an air cylinder attached to the clamp head housing, the cylinder having a piston rod extending therefrom which is reciprocally moveable about an axis;
a coupler removably connected to an end of the piston rod;
an intermediate link directly connected to an opposite end of the coupler by a first, rotational only pivotal connection, said intermediate link moving in a direction along said axis;
a generally T-shaped outer link having a leg portion in the form of a clevis which is directly rotatably mounted to another end of the intermediate link at a second, rotational only pivotal connection, one arm of the outer link being connected to the ear portions of the side plates of the clamp head at a third, rotational only pivotal connection to thereby define a stationary pivot point for the outer link wherein said second and third pivots located on a bottom surface of a clamping arm with said second pivot located between said third pivot and a workpiece.

* * * * *